US008659650B2

(12) United States Patent
Mugica et al.

(10) Patent No.: US 8,659,650 B2
(45) Date of Patent: Feb. 25, 2014

(54) PORTABLE APPARATUS FOR BIOMETRIC AND BIOGRAPHIC DATA COLLECTION, STORAGE AND DELIVERY, AND METHOD THEREFOR

(75) Inventors: Antonio Mugica, Caracas (VE); Roger Pinate, Caracas (VE); Paul Babic, Caracas (VE); Jorge M. Vasquez, Weston, FL (US); Romano Stasi, Weston, FL (US); Paul Chen, Taipei (TW); Ernesto Vecchi, Tomball, TX (US); German Dorta, Caracas (VE); Dimas Ulacio, Caracas (VE); Dany Farina, Caracas (VE); Luis Coronel, Caracas (VE); Fabiola Arrivillaga, Caracas (VE)

(73) Assignee: Smartmatic International Corporation (BB)

( * ) Notice: Subject to any disclaimer, the term of this patent is extended or adjusted under 35 U.S.C. 154(b) by 422 days.

(21) Appl. No.: 12/778,737

(22) Filed: May 12, 2010

(65) Prior Publication Data

US 2011/0007143 A1    Jan. 13, 2011

Related U.S. Application Data

(63) Continuation-in-part of application No. 29/338,829, filed on Jun. 19, 2009, now Pat. No. Des. 616,438, and a continuation-in-part of application No. 29/338,849, filed on Jun. 19, 2009, now Pat. No. Des. 616,439, and a continuation-in-part of application No. 29/338,832, filed on Jun. 19, 2009, now Pat. No. Des. 625,725.

(51) Int. Cl.
*H04N 7/18* (2006.01)

(52) U.S. Cl.
USPC .............................................. 348/77; 348/61

(58) Field of Classification Search
USPC ................. 348/77, 373, 211.14, 78, 156, 61; 382/115, 116, 118, 119, 124, 127; 361/754, 756
See application file for complete search history.

(56) References Cited

U.S. PATENT DOCUMENTS 4,754,487 A * 6/1988 Newmuis ...................... 382/118
D307,134 S 4/1990 Makidera
(Continued)

FOREIGN PATENT DOCUMENTS

WO WO 2009/013526 A1 1/2009
WO WO 2009/043047 A1 4/2009

OTHER PUBLICATIONS

International Search Report and Written Opinion for PCT Application No. PCT/US2010/036088, mailed Jul. 21, 2010.

(Continued)

*Primary Examiner* — Behrooz Senfi
(74) *Attorney, Agent, or Firm* — Oliff PLC

(57) ABSTRACT

The present disclosure relates to a method and apparatus for biometric and biographic data capture. The apparatus includes a main unit, a display monitor having a lower end that is pivotably attached to the main unit, a lower casing that houses the main unit, a bay formed in the lower casing for storing an input unit, an image capture device attached to an upper end of the monitor, the upper end being located on an opposite end of the display monitor compared to the lower end wherein the image capture device includes an illumination section for illuminating a subject to be imaged and an image capture section that captures an image of the subject, a secondary data input unit that is removably attached to the bay and is in communication with the main unit via a data transfer path, an upper casing securable to the lower casing so as to form an outer shell section, and a handle.

19 Claims, 13 Drawing Sheets

(56) References Cited

U.S. PATENT DOCUMENTS

| | | |
|---|---|---|
| 5,103,486 A | 4/1992 | Grippi |
| D332,943 S | 2/1993 | Koiwa et al. |
| D358,583 S | 5/1995 | Winkler |
| 5,657,201 A | 8/1997 | Kochis |
| D410,441 S | 6/1999 | Lin |
| D412,701 S | 8/1999 | Cantu |
| D438,204 S | 2/2001 | Winkler |
| 6,320,974 B1 | 11/2001 | Glaze et al. |
| 6,340,115 B1 | 1/2002 | Swartz |
| 6,357,663 B1 | 3/2002 | Takahashi et al. |
| 6,497,368 B1 | 12/2002 | Friend et al. |
| 6,575,904 B2 | 6/2003 | Nagai |
| 6,580,948 B2 | 6/2003 | Haupert |
| D480,725 S | 10/2003 | Funato |
| 6,641,033 B2 | 11/2003 | McClure |
| 6,736,316 B2 | 5/2004 | Neumark |
| 6,788,529 B2 | 9/2004 | Homer et al. |
| 6,857,567 B2 | 2/2005 | Latimer et al. |
| 6,909,597 B2 | 6/2005 | Tutikawa |
| 6,938,823 B2 | 9/2005 | Boccacci |
| 6,947,578 B2 | 9/2005 | Lee |
| 6,991,169 B2 | 1/2006 | Bobba |
| D522,511 S | 6/2006 | Sekou |
| D532,009 S | 11/2006 | Zank et al. |
| D535,974 S | 1/2007 | Alwicker et al. |
| D536,793 S | 2/2007 | Assad et al. |
| D538,806 S | 3/2007 | Brod et al. |
| D551,769 S | 9/2007 | Skwarek et al. |
| D560,280 S | 1/2008 | Skwarek et al. |
| D567,125 S | 4/2008 | Okabe et al. |
| D584,304 S | 1/2009 | Lin |
| D586,812 S | 2/2009 | Guenther |
| D616,438 S | 5/2010 | Mugica et al. |
| D616,439 S | 5/2010 | Mugica et al. |
| 2002/0149610 A1 * | 10/2002 | Lee .............................. 345/700 |
| 2003/0086591 A1 * | 5/2003 | Simon .......................... 382/115 |
| 2003/0132918 A1 | 7/2003 | Fitch et al. |
| 2004/0118915 A1 | 6/2004 | Daniel et al. |
| 2004/0199428 A1 | 10/2004 | Silverbrook et al. |
| 2005/0125258 A1 | 6/2005 | Yellin et al. |
| 2005/0243199 A1 * | 11/2005 | Bohaker et al. ............... 348/373 |
| 2007/0047770 A1 | 3/2007 | Swope et al. |
| 2008/0129710 A1 | 6/2008 | Kuo |
| 2008/0170049 A1 | 7/2008 | Larson et al. |
| 2008/0309645 A1 | 12/2008 | Wang |
| 2009/0008163 A1 | 1/2009 | Chikazawa et al. |
| 2009/0131077 A1 | 5/2009 | Paratore et al. |
| 2009/0150237 A1 * | 6/2009 | Gupta et al. .................... 705/14 |
| 2009/0196469 A1 * | 8/2009 | Hwang et al. ................. 382/125 |
| 2010/0110509 A1 * | 5/2010 | Cui et al. ...................... 358/498 |

OTHER PUBLICATIONS

U.S. Appl. No. 29/338,832, filed Jun. 19, 2009.
U.S. Office Action mailed Jan. 27, 2010, for U.S. Appl. No. 29/338,832.

* cited by examiner

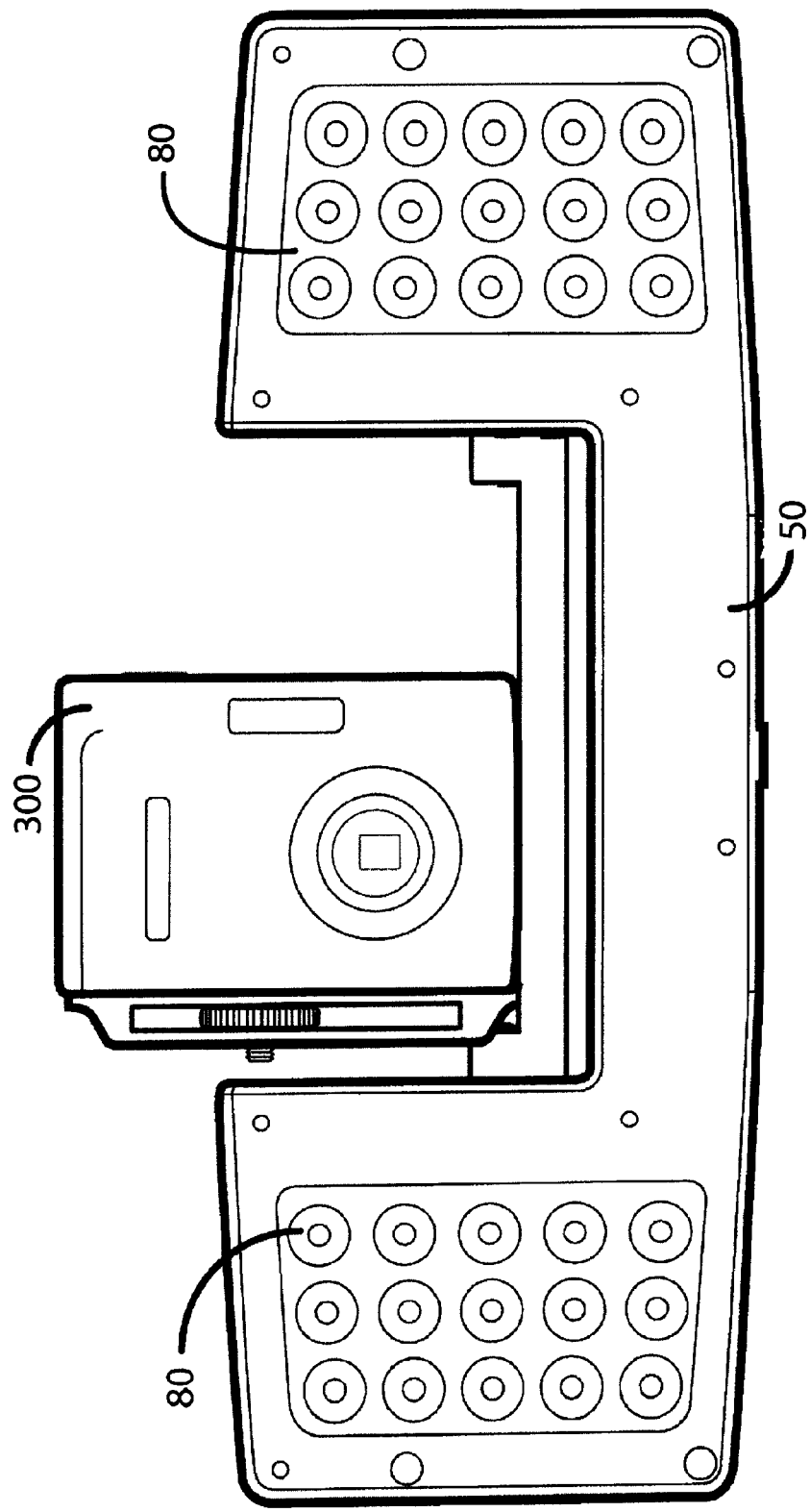

PORTABLE APPARATUS FOR BIOMETRIC AND BIOGRAPHIC DATA COLLECTION, STORAGE AND DELIVERY, AND METHOD THEREFOR

PRIORITY

This application is a Continuation-In-Part of U.S. patent application Ser. No. 29/338,829, filed Jun. 19, 2009, Ser. No. 29/338,849, filed Jun. 19, 2009 and Ser. No. 29/338,832, filed Jun. 19, 2009. The disclosure of each of these applications is hereby incorporated by reference in its entirety.

TECHNICAL FIELD

This disclosure relates generally to an apparatus and method for data capture, storage and delivery, particularly for capture, storage and delivery of biometric and biographic data. More particularly, this disclosure relates to an apparatus and method for automated data capture, storage and delivery of biometric and biographic information, which may be used, for example, in a population enrollment process or the like. In embodiments, this disclosure is directed to one or more electronic and optical devices integrated into a single device that is adaptable and configurable for various data registration projects, geographies and environmental conditions. In embodiments, the apparatus may be ruggedized and may be housed in a protected enclosure for ready transport, deployment and use.

BACKGROUND

Bureaucratic and cumbersome clerical procedures exist in all levels and branches of government, which contribute to inefficient processes. Civil registry services and citizen identification systems are no exception. National and local administrations have difficulties providing reliable and convenient civil registries and identification (ID) documents to citizens. Further, such administrations also have difficulties attempting to increase national security. Many attempts to increase national security have focused on increased control over denizens, reducing immigration fraud, enhancing detection of suspect individuals under false names and ID documents, and similar. Such attempts increase the need to collect, and/or update government records with, accurate, reliable and complete identity data of all individual citizens across entire populations.

Governments around the world have been adopting initiatives aimed at attaining efficient public administration through the application of technological resources. Significant advances have been brought about mainly through the use of information and communication technologies, attempting to disentangle the traditional bureaucratic and cumbersome clerical procedures in all levels and branches of government.

The agency in charge of data collection and authentication of vital records must typically make identity data readily available to other government agencies, and as a provider it must also guarantee the accuracy and fidelity of the supplied identity data. The availability and reliability of such data is a crucial requirement for the immigration, law enforcement, electoral, and security agencies of any nation. Specific state, local and federal government agencies, such as state Offices of Vital Records, or their authorized agents, are responsible for civil registry. Civil registry consists essentially of collecting, storing, authenticating and updating identity information and vital records of individuals, also known as biometrical and biographical information. The biometrical and biographical information includes, for example, information related to birth, adoption, nationalities, marriages, divorces, death, education, occupations, religion, home addresses, financial data, employment history, political inclinations, police records, hobbies, sports practiced, fingerprints, blood type, genetic information and, etc.

Other biometrical information, such as anatomical biometrical information, may include, for example, face geometry, facial features and singularities (for example, "face recognition"), hand and palm geometry, iris images (for example, "iris recognition"), retinal scan, scans of blood vessels and vein patterns, among others. Other biometrical information, such as characteristics useful in the field of biometry, which are behavioral, include, for example, typing speed, voice patterns, and body mechanics, among others.

Biometrical information is regarded as essential for assisting law enforcement and other security agencies to prevent and prosecute crime.

Citizens who need to obtain or renew personal legal documents such as birth certificates, ID cards, passports, marriage/divorce certificates, driver's licenses and the like, must comply with government regulations. The government regulations require citizens to register and/or update their identity information, which typically is a lengthy process that involves travel to visit the physical location of the appropriate authority or agency. Once the individual has arrived at the appropriate facility, the individual typically must provide requested personal data into documents. Alternatively, some facilities allow the individual to submit required data by means of a suitable procedure provided through a pre-registration website via the Internet.

After the requested data has been supplied by the individual, the individual must then sit in front of an official who receives the supplied documents, enters updated, missing or complementary information into a data entry station that may be a part of a network, takes fingerprints one by one, takes one or more facial photographs, captures a digital signature, etc. These procedures are time consuming and the locations or offices are usually crowded. The crowded offices thus require that people must wait in lines or for numbers to be called, often repeatedly in the case of more than one transaction or document type being sought. The process is thus lengthy and undesirable for people who may have disabilities, have children in tow, or have traveled from distant locations, such as remote rural or mountainous areas.

Individuals required to register must usually travel to a city to register. Often times, the person has incomplete documentation for registration and may be required to travel back and forth from their residence to the registration location multiple times to retrieve necessary documents or information. Due to the perceived excessive length and toil of the process, some individuals become disgruntled and may give up and turn away discouraged.

A registration service, endowed with the proper technological tools, and able to serve and perform civil registration duties for denizens closer to their homes or more accessible locations is desirable for achieving the goal of 100% percent registration of a given population, or desired group of individuals. For example, being able to set up the needed equipment in improvised settings, such as kiosks or booths set up within local neighborhoods, is desirable.

SUMMARY

The present disclosure addresses these and other issues by providing an apparatus and method incorporating, for example, electronic, optical, information processing, data storage and communications technologies.

In embodiments, the apparatus and methods are incorporated into a portable, easy-to-set-up, easy-to-use, secure and convenient data entry station.

In embodiments, this disclosure is directed to one or more electronic and optical devices integrated into a single device that is adaptable and configurable for various data registration projects, geographies and environmental conditions.

In embodiments, the apparatus may be ruggedized and may be housed in a protected enclosure for transport, deployment and use.

BRIEF DESCRIPTION OF THE DRAWINGS

FIG. 5b shows an embodiment of a high-resolution digital camera component of the stationary type.

DETAILED DESCRIPTION OF EMBODIMENTS

Figure 1A:
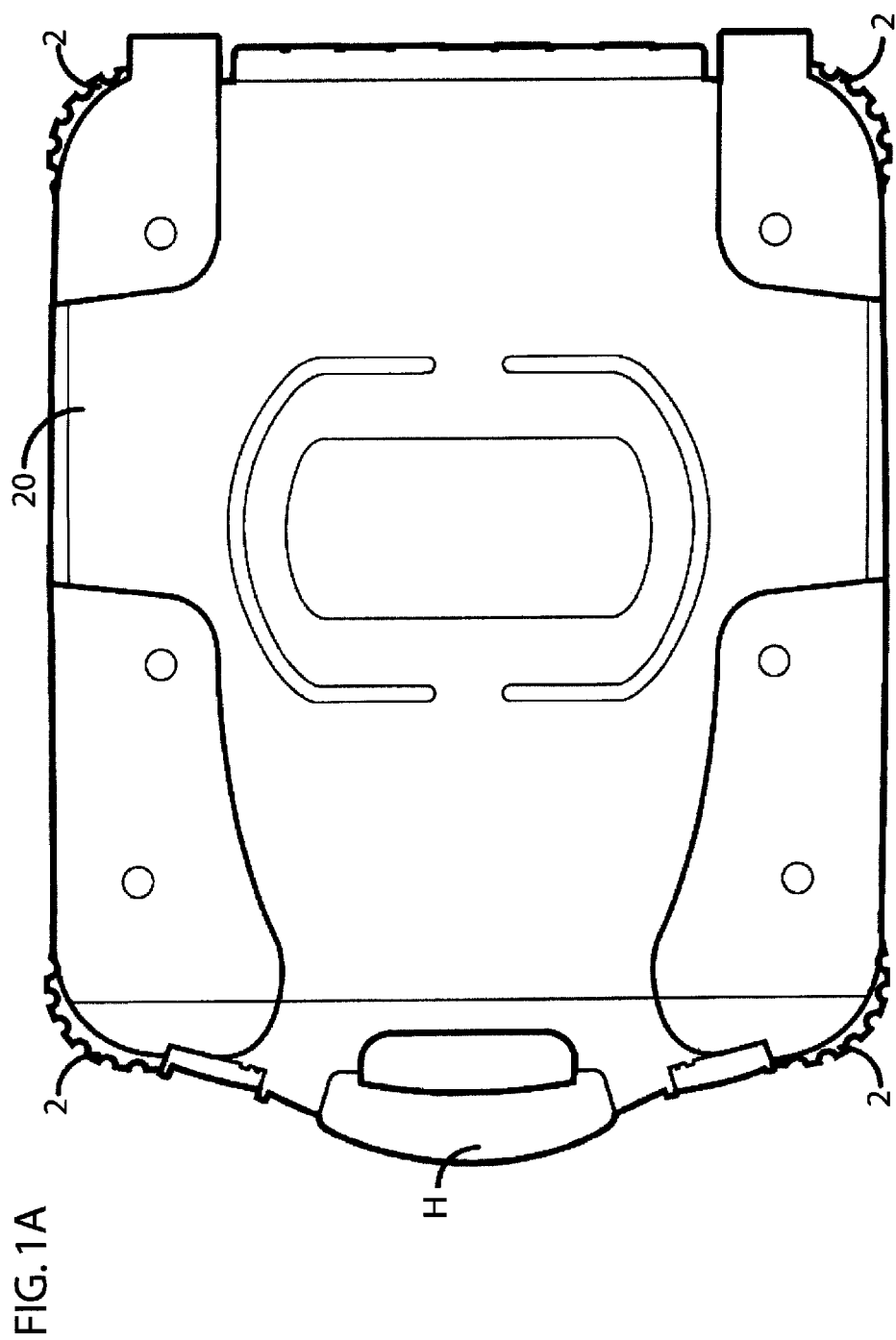
FIG. 1a is a diagram illustrating an embodiment of the apparatus shown with a closed cover of a protective enclosure, as viewed from above.

The present disclosure provides an apparatus and method for data capture, storage and delivery for biometric and biographic data.

Details of embodiments will be described with reference to the drawing Figures, wherein like numerals refer to the same components throughout.

Figure 3A:
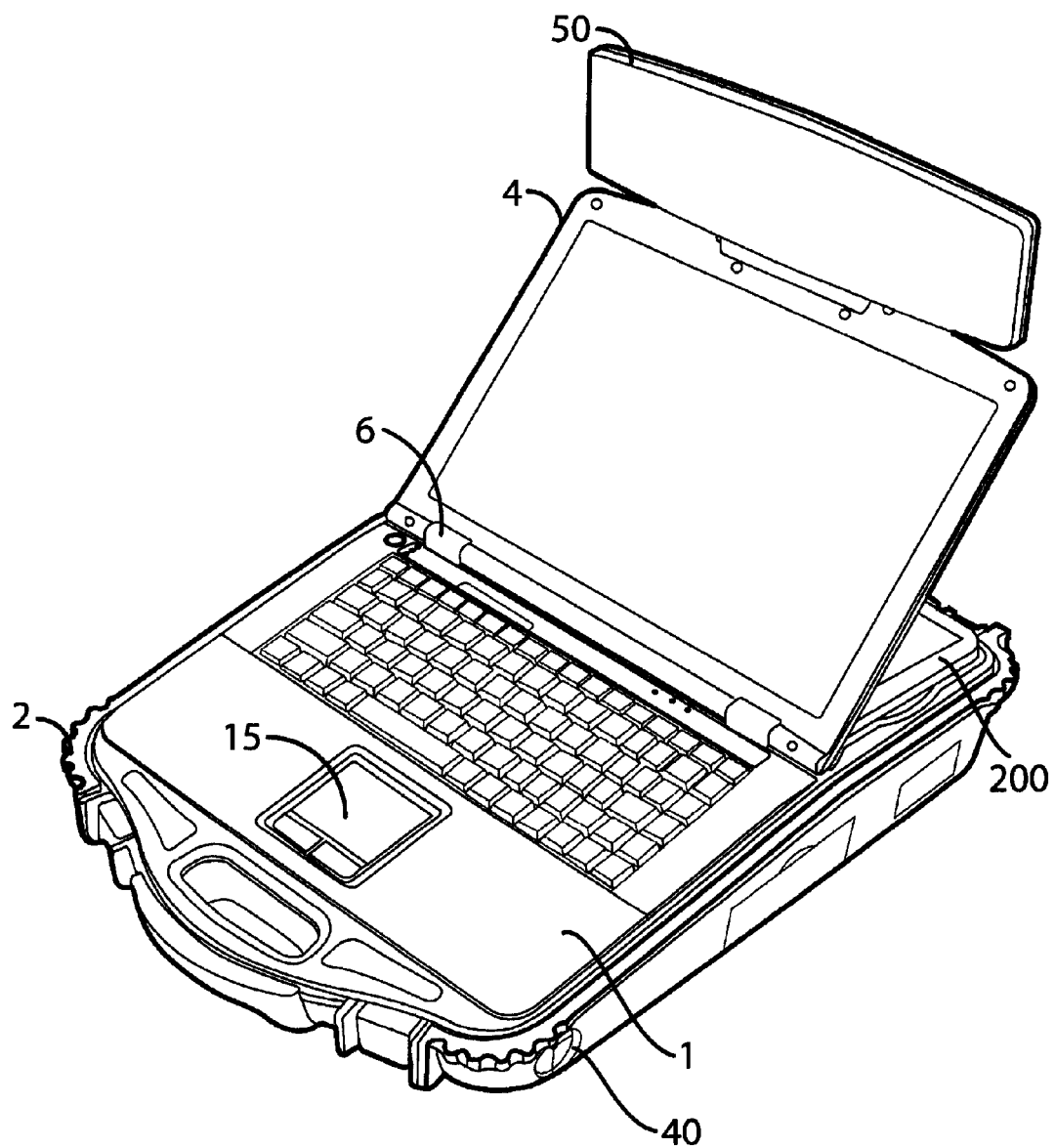
FIG. 3a is a perspective diagram illustrating an embodiment of the apparatus, with the cover detached, and with both a monitor screen, an illumination and digital camera sub-assembly tilted up, showing a front side of the embodiment of the apparatus as seen from above.
Figure 3B:
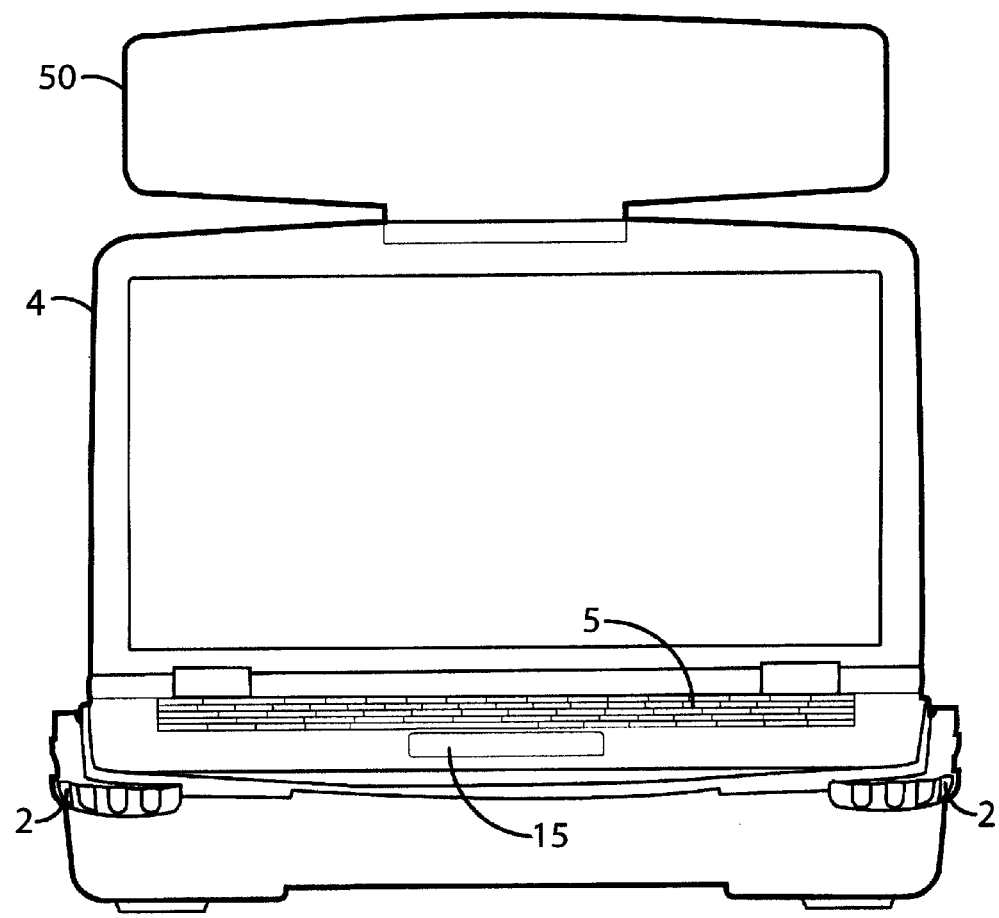
FIG. 3b is a horizontal view illustrating an embodiment of the apparatus, with the cover detached, and with both a monitor screen, an illumination and digital camera sub-assembly tilted up, showing a front side of the unit.
Figure 3C:
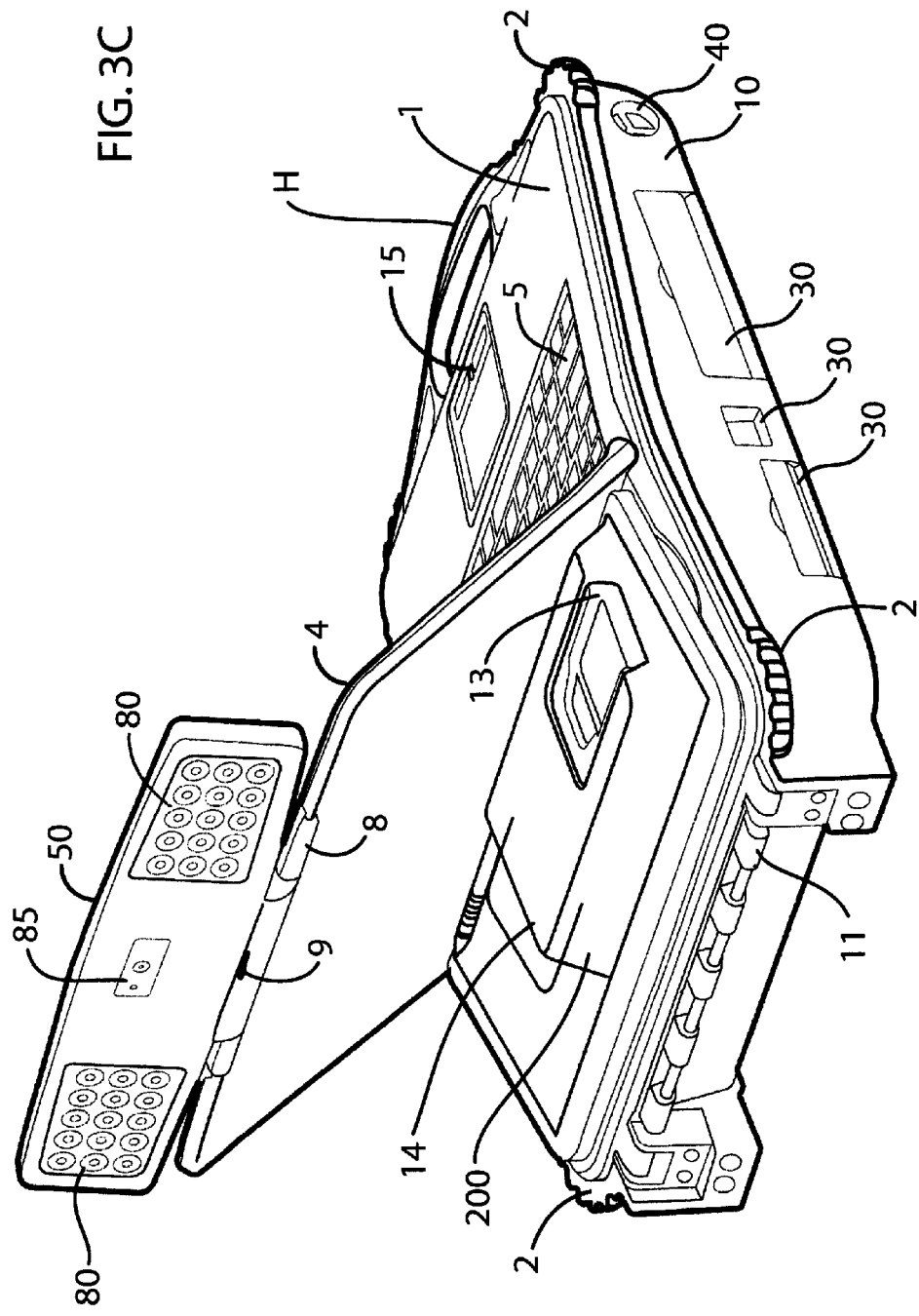
FIG. 3c illustrates an embodiment of the apparatus with a cover detached, and with both a monitor screen, an illumination and digital camera sub-assembly tilted up, showing a back side of the unit as seen from above.
Figure 3D:
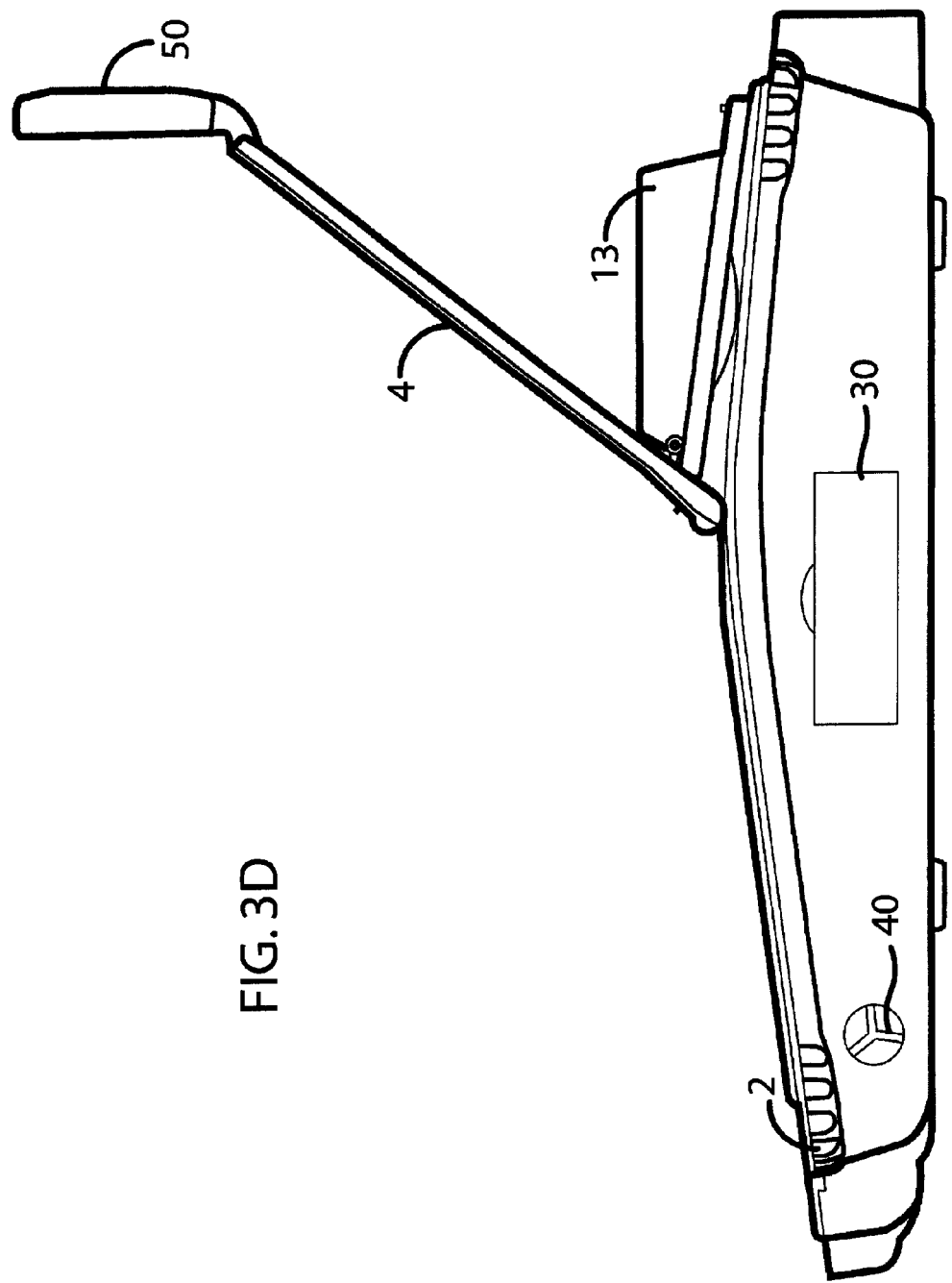
FIG. 3d is a horizontal view illustrating an embodiment of the apparatus with the cover detached, and with both the monitor screen, illumination and digital camera sub-assembly tilted up, showing the right-hand side of the unit.

Generally, as shown in FIG. 3c, the apparatus comprises a main unit 1, which may generally resemble a portable computer, such as a laptop computer. The main unit 1 generally includes a keyboard 5, a monitor 4 and a tactile input device 15. Additional features of the main unit, not shown, include: a processor (CPU), memory (such as RAM), a hard drive, a power supply, networking elements, a battery and the like. The main unit 1 may also comprise a communication device, such as an integrated communication device including, but not limited to a telephone modem, cellular modem, WiFi, WiMAX, Ethernet, Bluetooth, Infrared (IR), Satellite and the like.

Main unit 1 includes a monitor 4. Monitor 4 may be fixedly attached to the main unit 1 by a hinge 6 that allows for the monitor to be pivoted down to a stowage position, and pivoted upwardly to an operational position in which a user may view the monitor 4. The monitor 4 may be a liquid crystal display (LCD), touchscreen and the like. The monitor 4 may include an attachment portion 8 for attaching an image capture device 50. The attachment portion 8 may be a hinge mount, screw mount, friction clip and the like. The attachment portion 8 may include a secondary pivot portion 9 to allow the image capture device 50 to rotate independently of the monitor 4 and attachment portion 8. The attachment portion 8 may be affixed permanently or detachably to the monitor 4.

The main unit 1 is housed and/or integrated into lower casing 10. Lower casing 10 may include a ventilation port 40 for allowing cooling of the internal componentry of the main unit 1. The main unit 1 may include one or more access ports 30 for allowing access to connect, through the lower casing 10 to the main unit 1, additional sub-assemblies or peripherals, for example, USB connections, serial connections, parallel, fax/modem, Ethernet, DC input, audio, video, memory card (for example, SD, mini SD, compact flash and the like). Main unit 1 may include a Smart Card reader 7 located, for example, between the monitor 4 and the keyboard 5.

Lower casing 10 may be ruggedized, and include bumpers 2 for shock absorption in the case of accidental drops or falls. The bumpers 2 may be located at one or more corners of the lower casing, at any such points determined to require additional protection and/or locations determined to be the most likely contact points of the apparatus during a fall. The bumpers 2 may be located at the corners of the lower casing and further extend around a periphery of the lower casing 10.

Lower casing 10 and bumpers 2 may be comprised of one or more materials, such as plastics, rubber, synthetic rubber or other known shock and/or impact absorbing materials. Lower casing 10 may include other features promoting ruggedization, such as internal ribs and screw and nut covers. Lower casing 10 may include a handle H to allow for carrying of the apparatus. The handle H is shown located at a front portion of the apparatus, but may be located anywhere on the casing.

For example, the ruggedized lower casing 10 allows the apparatus to be in operational condition after a three foot drop test, based upon Military Standard MIL-STD-810F.

Figure 1B:
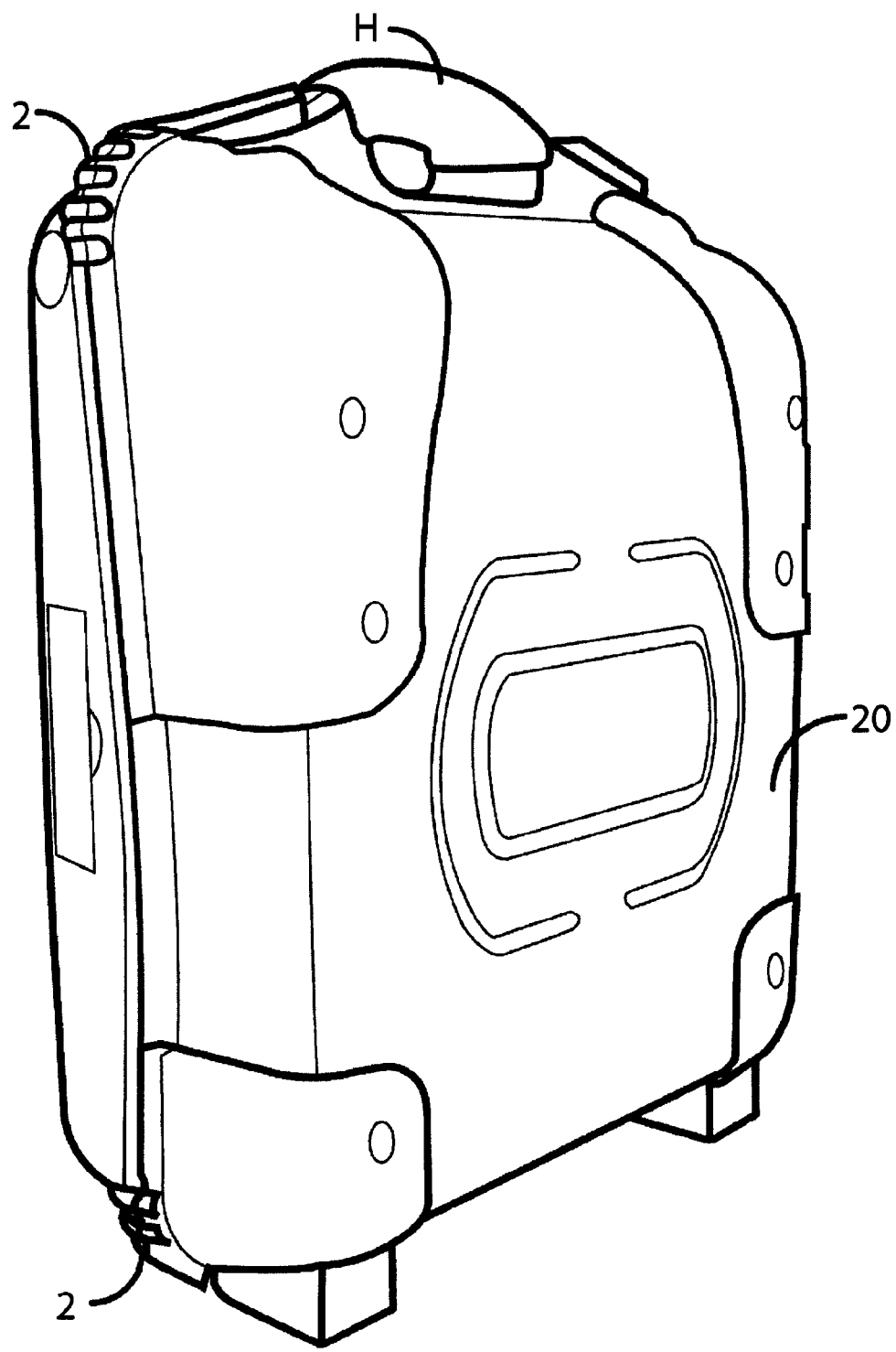
FIG. 1b is a perspective diagram illustrating an embodiment of the apparatus shown with a closed cover of a protective enclosure

Lower casing 10 may include a case connecting portion 11 to allow for secure attachment to an upper casing 20. Connecting portion 11 may be formed in a manner such that it allows for pivotally attaching the upper casing 20 to the lower casing 10, yet allowing for tool-free removal of the upper casing 20, when upper casing 20 is in an open position. As shown, for example, in FIGS. 2a, 2b and 3a-3d, an open position refers to the upper casing being at least partially rotated upwardly, or completely removed, from the lower casing so as to expose at least a portion of the main unit 1. As shown in FIGS. 1a and 1b, upper casing 20 may be formed in the same ruggedized materials of the lower casing 10, include bumpers 2 and have a corresponding handle section H that, when upper casing 20 is in a closed position, matches to the handle H of the lower casing 10.

Lower casing 10 may include a security bay (not shown), for example on a bottom side of the lower casing 10. The security bay may comprise a lock, such as a key lock or electronic lock, allowing access only to an operator providing the required key.

Figure 2A:
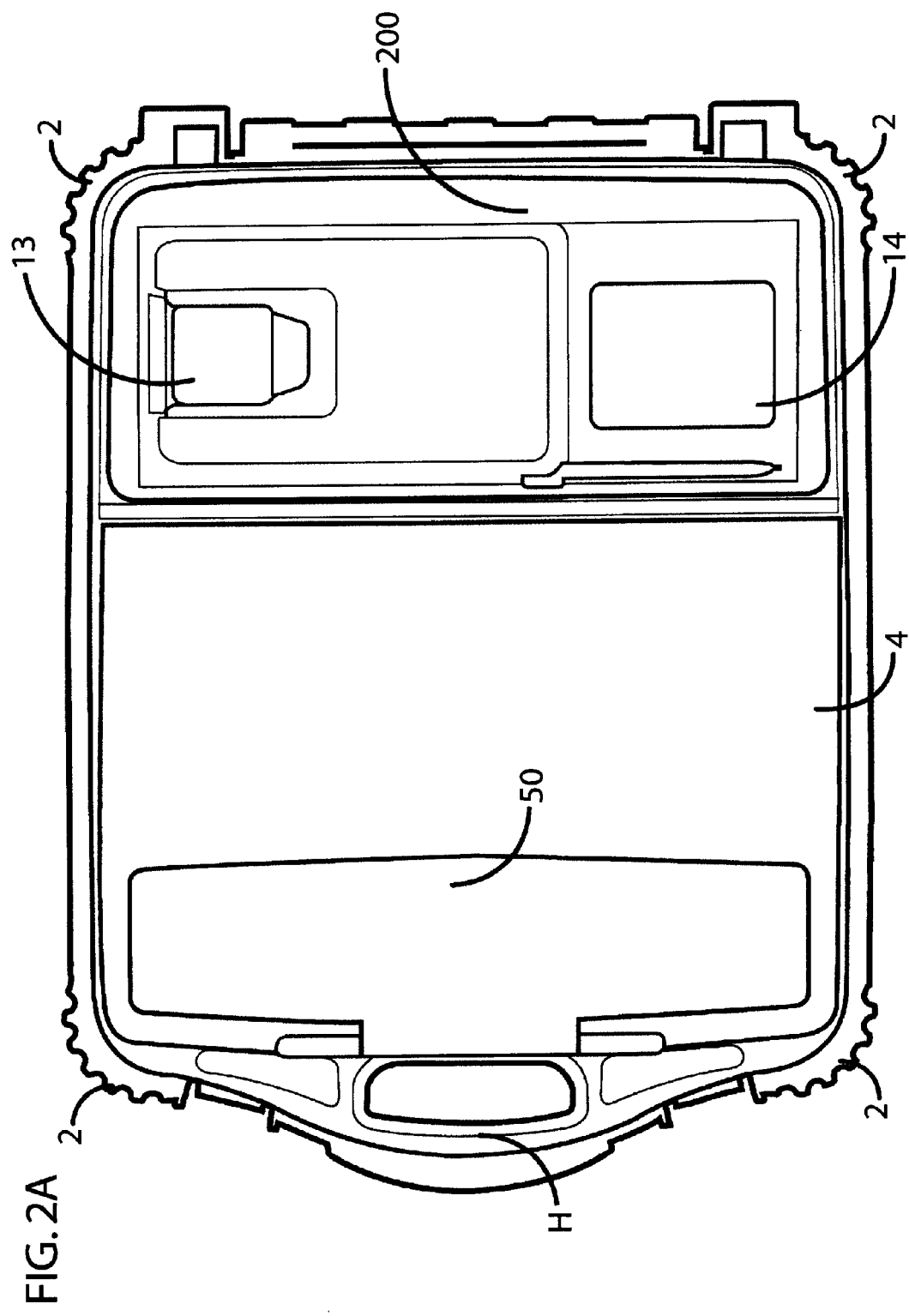
FIG. 2a is a vertical view diagram illustrating an embodiment of the apparatus, shown with a cover detached from the protective enclosure.
Figure 2B:
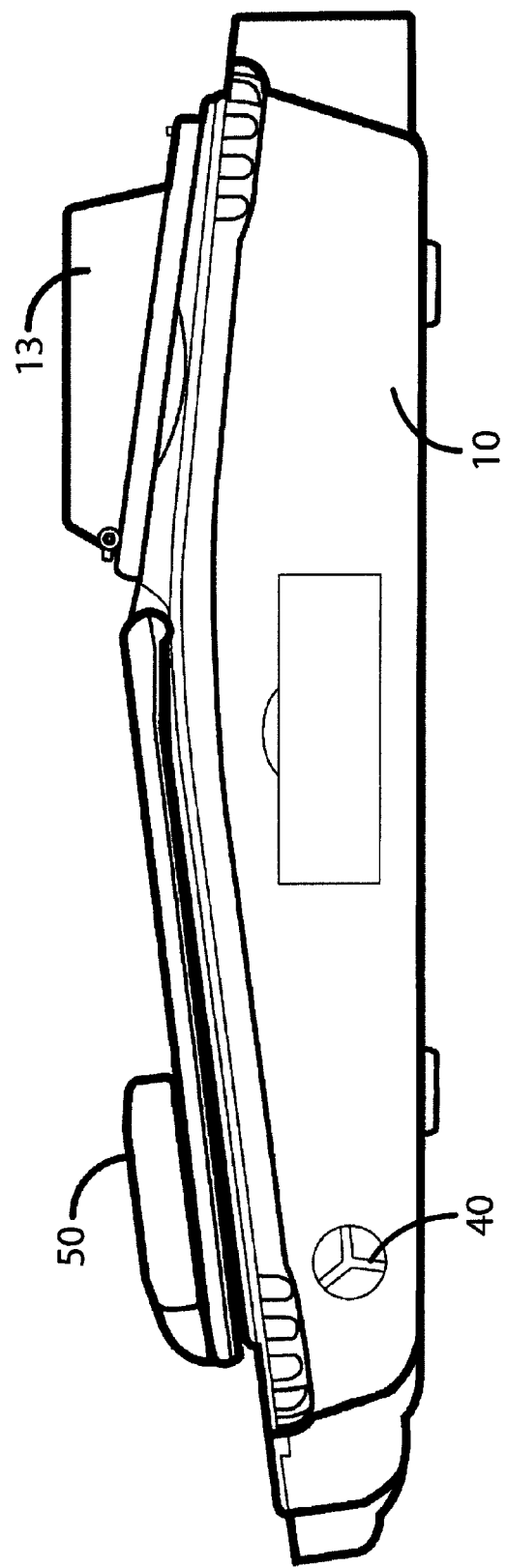
FIG. 2b is a horizontal view diagram illustrating an embodiment of the apparatus, shown with the cover detached, as viewed from a right-hand side.

As shown in FIG. 2b, the image capture device 50 and the input device 200 are capable of being placed in a stowage/closed position that allows for the upper casing 20 to be attached to the lower casing 10 such that the image capture device 50 and the input device 200 are entirely contained within the outer shell formed by the upper casing 20 and the lower casing 10 (FIG. 1b).

Figure 4:
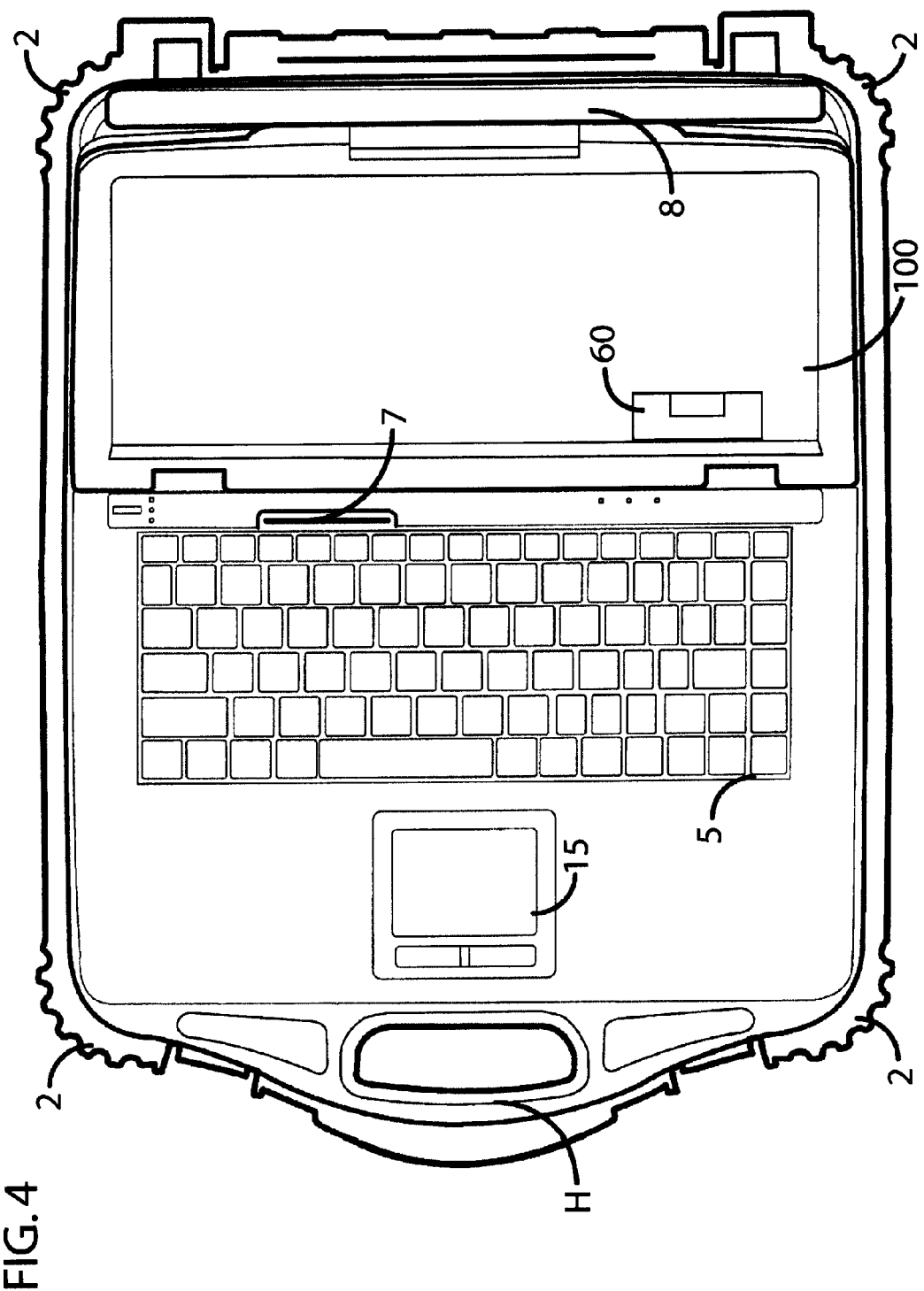
FIG. 4 is a vertical view showing an embodiment of the apparatus and various detachable components.
Figure 6:
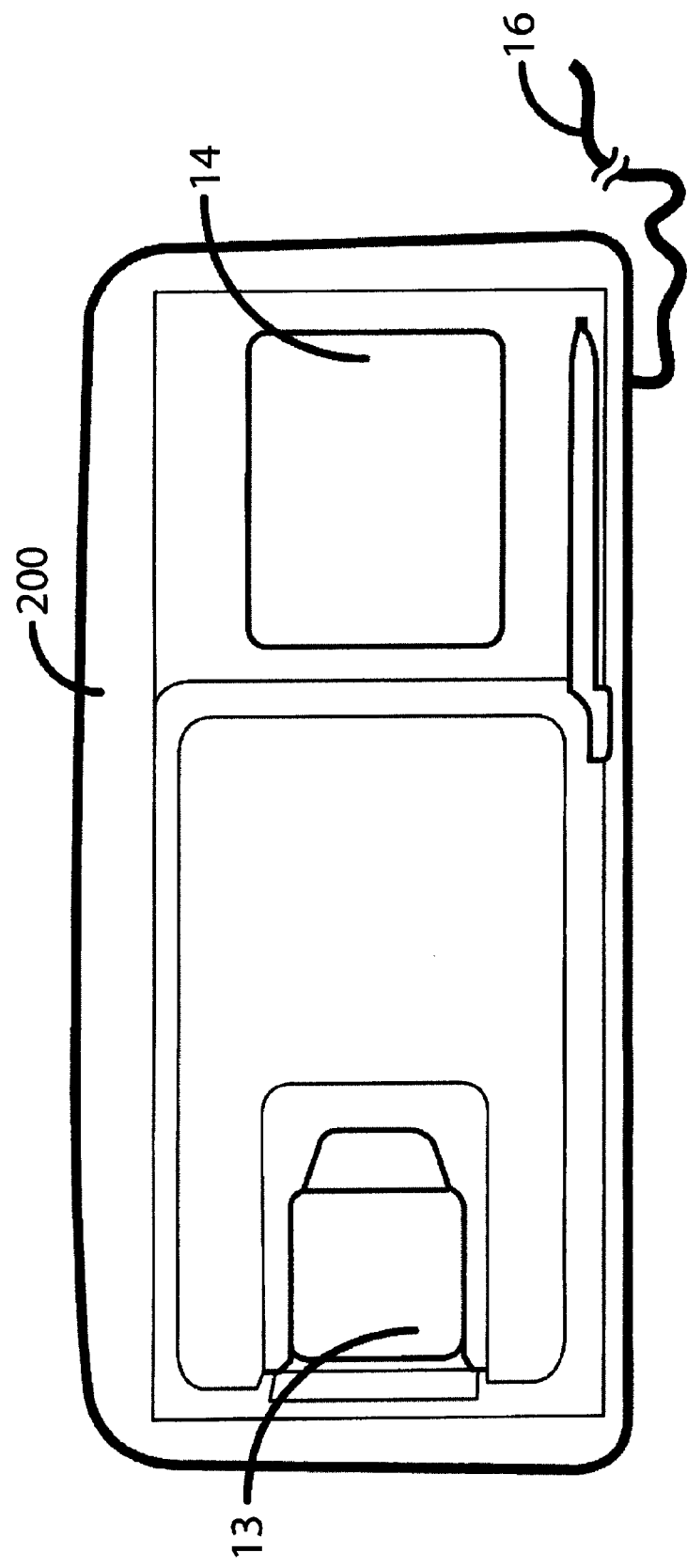
FIG. 6 is an illustration of an embodiment of a detachable biometric sub-assembly component.
Figure 7:
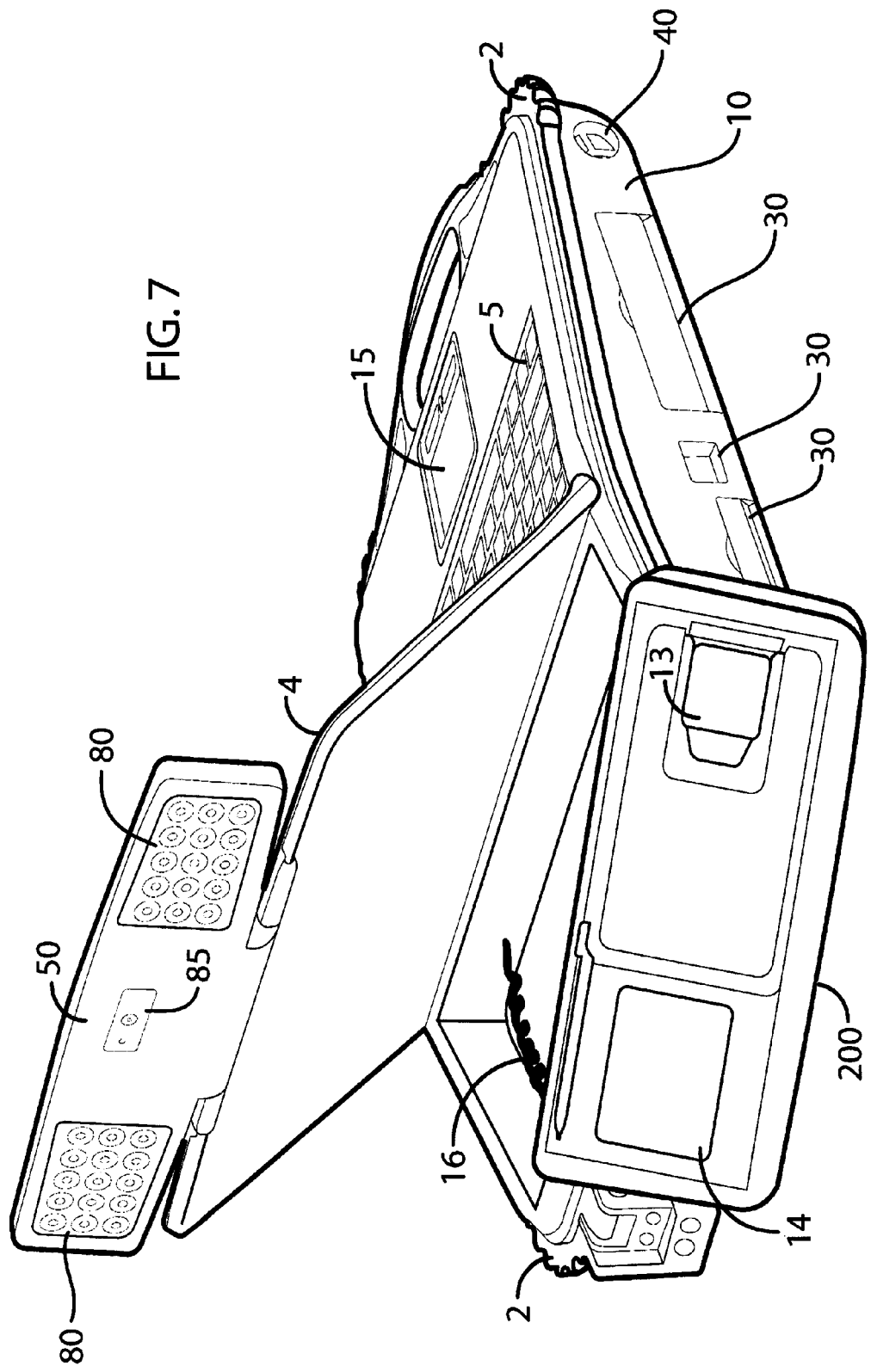
FIG. 7 illustrates an embodiment of the apparatus with the biometric sub-assembly detached.

As shown, for example, in FIGS. 4 and 7, lower casing 10 may also include a bay 100 for storing an input device 200. The bay 100 may include a quick release mounting system, such as a release button or lever (not shown), for tool-free attachment and detachment of the input device 200. The bay 100 may further include a connector portion 60 to connect the main unit 1 to the input device 200. The connector portion 60 may be an attachment portion for a cable 16 (FIGS. 6 and 7) that allows for connecting the main unit 1 to the input device 200.

As shown, for example, in FIG. 6, the input device 200 may include one or more biometric data capture devices 13. Biometric capture devices that may be included in the input device 200 include, but are not limited to: a single fingerprint reader, a dual fingerprint reader, a live scan reader that captures multiple fingerprints at one time, or one rolled fingerprint at a time, a palm reader, a signature pad, a vein pattern scanner and the like.

The input device 200 may also include one or more identity management devices 14. Identity management devices that may be included in the input device 200 include, but are not limited to: a credential printer, a receipt printer, a smartcard reader, an RFID reader, barcode reader, magnetic strip reader, passport or ID reader, MRZ code reader, optical reader, a keypad and the like.

The input device 200 may be detachable from the lower casing 10 while remaining in communication with the main unit 1. For example, a cable 16, such as a retractable or expandable cable, may be connected between the input device 200 and the connector portion 60. The cable 16 may be connected and disconnected from one or both of the connector portion 60 and the input device 200. Alternatively, the input device may be in communication with the main unit 1 via a wireless connection, such as a Bluetooth, WiFi, IR or other wireless connection. In the case of using a wireless connection, the input device 200 and the main unit 1 will include a wireless communication means, such as a wireless transceiver.

The input device 200 may be a modular design, for example, plug-and-play, wherein the input device 200 is capable of being readily installed on multiple different main units. The modular design of the input device 200 in combination with the bay 100 allows for the ready interchangeability/addition of multiple supported devices, thus providing an integrated, yet flexible, system. Thus, a new apparatus is not needed for each different type of data capture that is desired (for example, fingerprints, signature, palm reader, etc.).

Figure 5A:
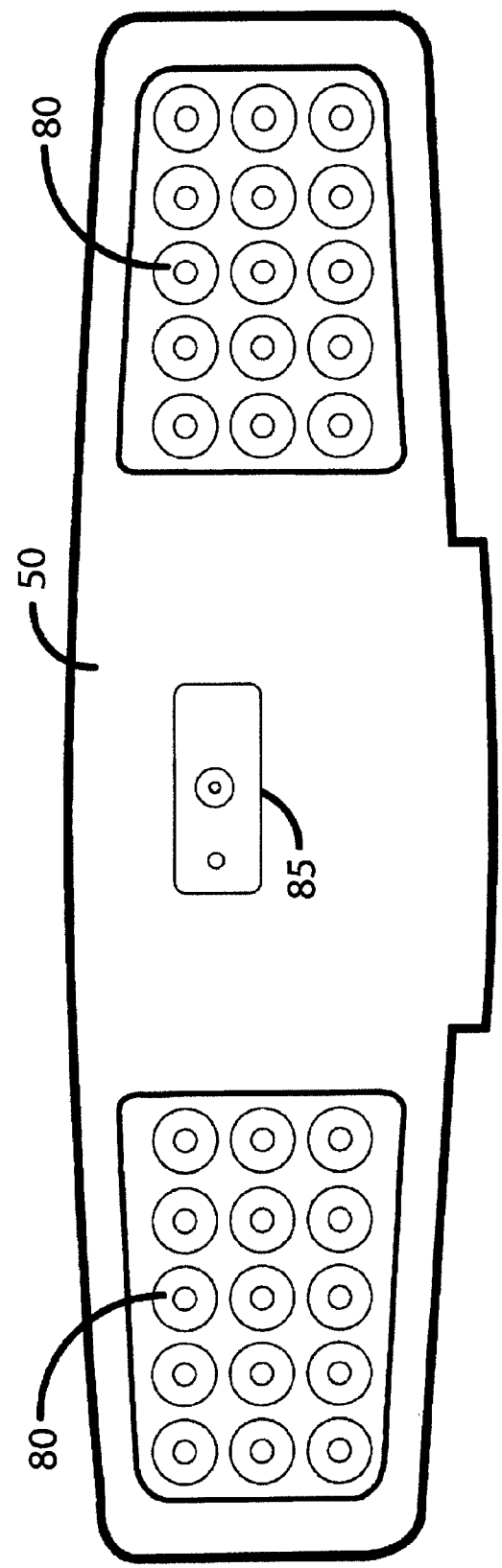
FIG. 5a is a schematic view of an embodiment of an integrated illumination and digital camera sub-assembly component.

The image capture device 50 may also be part of the integrated design of the apparatus, and attaches to the apparatus via the attachment portion 8. The image capture device 50 may include lateral light sources 80 for illuminating the subject to be imaged. The lateral light sources 80 provide increased illumination light for imaging such that shadows may be reduced or eliminated. As shown, for example, in FIG. 5a, the lateral light sources 80 are disposed to the left and/or right sides of lens section 85 of the image capture device 50. Desirably, there is a light source on each of the left and right sides of the lens section 85 of the image capture device 50. The lateral light sources 80 may be comprised of a plurality of individual light sources, for example, each lateral light source may comprise several, for example, two to fifteen individual LEDs. When the lens section 85 of the image capture device 50 is located substantially in the center between two lateral light sources 80, shadows on the subject may be eliminated or reduced substantially. Where more than one lateral light sources 80 are provided, they may be linked via a controller so as to operate individually or simultaneously. The controller may also be configured to adjust the light output (brightness) of the LEDs based upon a user input or a predetermined amount of light output.

In embodiments, the image capture device 50 may be a webcam, digital camera, video camera, iris capture device, iris scanner, combination iris scanner/digital camera or the like. As shown in FIG. 5b, the image capture device 50 may comprise a removable digital camera 300, that is removably secured to the image capture device 50.

The attachment portion 8 and secondary pivot portion 9 allow the image capture device 50 to be able to tilt substantially through 180 degrees each direction relative to the horizontal plane and further allow the image capture device 50 to pan sideways in either the clockwise or counterclockwise direction, substantially through 180 degrees in each direction, for example, 135 degrees in each direction. The panning and tilt functionality allows for the possibility of a user taking a picture of a subject sitting next to the user.

Generally, before use, the main unit 1 will be enclosed by having the upper casing 20 in the closed position, as shown in FIG. 1. In operation the operator of the apparatus will pivot the upper casing 20 to an open position, or detach the upper casing 20 from the lower casing 10, exposing the main unit 1, as shown in FIG. 2b. The main unit 1 may be powered using an internal battery that is integrated into the main unit 1, and protectively housed within the lower casing 10. Alternatively, the operator may choose to attach an external power source to the apparatus, such as an AC power source or DC power source to increase the time the apparatus may be operated.

In operation, the main unit 1 may be programmed to run multiple different programs, such as an administration module, a people registration module, a people search module, a reports module and a data export module.

The administration module may include, for example, a definition and maintenance of operators, permissions assigned to operators, and a system diagnostic function including diagnostic evaluation of any connected peripherals or sub-assemblies, such as the image capture device 50 and the input device 200.

The people registration module controls operations for any connected peripherals or sub-assemblies, such as the image capture device 50, the input device 200, the keyboard 5. For example, peripheral devices to be added to the apparatus may be provided by third-party vendors, who also provide drivers (controller software) to be installed on the operating system that runs on the main unit 1 of the apparatus. The drivers are pieces of software that main unit 1 communicates with to instruct a peripheral to its job (for example, starting video, taking pictures and sending them to the people registration module). Such jobs for the peripherals may include: acquiring images (cameras); acquiring fingerprints (fingerprint readers), analyzing fingerprint quantity and quality (multi-fingerprint readers), printing enrollment receipts (printers), printing ID cards (card printers), turning lights on and off (LEDs), acquiring iris images (iris readers), etc. The peripherals used by the apparatus may be instructed when to start working and, in the case of biometric sample acquisition devices, they usually return some digital representation of the acquired samples. Thus, the people registration module orchestrates each peripheral in doing a certain job.

The people search module allows the operator to search for people matching specific criteria entered by the operator, for example, a predetermined set of criteria. The people search module allows the operator to perform searches of individual records within the data already stored within the main unit 1, or if connected to a network, data stored on the network. The people search operation may be textual (for example, searching a name, ID number and the like) or may be image based (for example, searching fingerprints, signatures or other captured images).

During operation of the apparatus, the data entry process may be interactive with the operator. In facial photograph and live signature scan biometric data capture unit operations, the operator and the subject being enrolled are capable of reviewing an image stored in the input unit 200 or captured by the image capture unit 50. The operator and/or user is allowed to accept or reject the obtained image, allowing for the possibility to re-take an unacceptable image.

The people registration module may also include automatic quality assessment software that alerts the operator whether a facial photograph complies with certain standards or quality requirements. The people registration module can thus determine the acceptance of some images. The people registration software may be programmed to allow/forbid the operator to override the automatic determination of acceptance by the people registration module.

The automatic quality assessment and user acceptance may apply to fingerprint images, iris images and any and all biometric information that are acquired. Each category of biometric information allows for some type of analysis (for example, digital, image, mathematical, etc.) that can help to determine if a particular acquired sample is acceptable or not. Further determination may be made based upon predictions of whether the acquired sample will perform well under a large-database scenario in terms of matching accuracy.

The reports module allows the operator to print, report or audit data stored in the main unit 1 or stored on a network, if the apparatus is connected to the network. Examples of reports that may be provided are log reports, showing statistics of the operators and their respective sessions, overall registration statistics and export reports, which show data export results.

The data export module processes an operator's requests to export data that has been captured and/or stored to the main unit 1. The data export module allows the operator to export the data onto an external storage medium, such as a CD-R or other computer memory device. The operator may specify a beginning and end date of the data to be included in the exported data. The data may be compressed using data compression before being exported to reduce the exported data size.

The apparatus may be compliant with one or more of the following standards, including, but not limited to: ANSI/INCITS 378 (Information technology—Finger minutiae format for data interchange); ISO/IEC 19794-2 (Information technology—Biometric data interchange formats, part 2 finger minutiae data); CBEFF (BioAPI): BioAPI variation of CBEFF is defined as a Biometric Identification Record (BIR); ICAO; WSQ Compression; JPEG/JPEG 2000; FIPS 201, ISO 7811/2 (Identity Verification (PIV), ISO Magnetic Stripe Card Standards); ISO 7816: Smart Card Standard; ISO 7816-1: Physical characteristics; ISO 7816-2: Dimensions and location of the contacts; ISO 7816-3: Electronic signals and transmission protocols; ISO 7816-4: Industry commands for interchange; ISO 7816-5: Number system and registration procedure for application identifiers; ISO 7816-6: Inter-industry data elements; PDF417: stacked linear bar code symbol used in a variety of applications (2D bar code); and UL94-V2: V-2 Flame Retardant PP Copolymer with High Impact Strength.

It is further appreciated that various adaptations and modifications of the above described embodiments can be configured without departing from the scope and spirit of the invention. Therefore, it is to be understood that the present disclosure may be practiced other than as specifically described herein. The present disclosure is thus intended to be illustrative, and not restrictive.

What is claimed is:

1. An apparatus for biometric and biographic data capture, comprising:
   a main unit;
   a display monitor having a lower end that is pivotably attached to the main unit;
   a lower casing that houses the main unit;
   a bay formed in the lower casing for storing an input unit;
   an image capture device attached to an upper end of the monitor, the upper end being located on an opposite end of the display monitor compared to the lower end;
      wherein the image capture device comprises an illumination section for illuminating a subject to be imaged and an image capture section that captures an image of the subject;
   a secondary data input unit removably attached to the bay and being in communication with the main unit via a data transfer path,
   an upper casing securable to the lower casing so as to form an outer shell section, and
   a handle,
   wherein the main unit further includes a people registration module that determines whether the image captured by the image capture device is acceptable,
   wherein the bay includes a release button or lever configured to allow for attachment and detachment of the secondary data input unit, and
   wherein, when the secondary data input unit is in an attached position, the data transfer path comprises a direct connection between the secondary data input unit and the main unit, and
   wherein, when the secondary data input unit is in a detached position, the data transfer path comprises at least one of (1) a data cable attached to the secondary data input unit and the main unit and (2) a wireless connection between the secondary data input unit and the main unit.

2. The apparatus according to claim 1, wherein the image capture device is attached to the monitor by an attachment portion that allows the image capture device to pivot around at least one axis.

3. The apparatus according to claim 1, wherein the image capture device is attached to the monitor by an attachment portion that allows the image capture device to pivot around at least two axes.

4. The apparatus according to claim 1, wherein the illumination section comprises a first light emitting section and a second light emitting section, the first light emitting section being disposed on a first side of the image capture section, and the second light emitting section being disposed on an opposite side of the image capture section compared to the first light emitting section.

5. The apparatus according to claim 4, wherein each of the first light emitting section and the second light emitting section comprise a plurality of LEDs.

6. The apparatus according to claim 1, wherein the lower casing and the upper casing each comprise one or more impact absorbing bumpers so as to ruggedize the apparatus.

7. The apparatus according to claim 1, wherein the secondary input unit comprises one or more of a single fingerprint reader, a dual fingerprint reader, a live scan reader, a palm reader, a signature pad, a vein pattern scanner, iris scanner, a credential printer, a receipt printer, a smartcard reader, an RFID reader, barcode reader, magnetic strip reader, passport or ID reader, MRZ code reader, optical reader and a keypad.

8. The apparatus according to claim 1, wherein the display monitor, the image capture device and the secondary data input unit are configured to have a stowage position that allows for the upper casing to be attached to the lower casing such that the image capture device and the secondary data input unit are entirely contained within the outer shell formed by the upper casing and the lower casing.

9. The apparatus according to claim 1, wherein the lower casing further comprises a case connecting portion that allows the upper casing to be pivotably attached to the lower casing.

10. The apparatus according to claim 1, wherein the lower casing further comprises one or more access ports providing access to the main unit.

11. The apparatus according to claim 10, wherein the one or more access ports comprise at least one of a USB connector, serial connector, parallel connector, Firewire connector, fax/modem connector, Ethernet connector, internet connector, network connector, AC power connector, DC power connector, audio connector, video connector and memory card connector.

12. The apparatus according to claim 1, wherein the lower casing further comprises a security bay located on a bottom side of the lower casing that is lockable.

13. The apparatus according to claim 1, wherein the main unit further comprises at least one of a processor, a memory circuit, a hard drive, a power supply, a networking element and a battery.

14. A method of biographic and biometric data capture, comprising:
providing data to an apparatus for biometric and biographic data capture, the apparatus comprising:
a main unit;
a display monitor having a lower end that is pivotably attached to the main unit;
a lower casing that houses the main unit;
a bay formed in the lower casing for storing an input unit;
an image capture device attached to an upper end of the monitor, the upper end being located on an opposite end of the display monitor compared to the lower end;
wherein the image capture device comprises an illumination section for illuminating a subject to be imaged and an image capture section that captures an image of the subject;
a secondary data input unit removably attached to the bay and being in communication with the main unit via a data transfer path,
an upper casing securable to the lower casing so as to form an outer shell section,
wherein the main unit further includes a people registration module that determines whether the image captured by the image capture device is acceptable,
wherein the bay includes a release button or lever configured to allow for attachment and detachment of the secondary data input unit, and
wherein, when the secondary data input unit is in an attached position, the data transfer path comprises a direct connection between the secondary data input unit and the main unit, and
wherein, when the secondary data input unit is in a detached position, the data transfer path comprises at least one of (1) a data cable attached to the secondary data input unit and the main unit and (2) a wireless connection between the secondary data input unit and the main unit.

15. The method according to claim 14, wherein the provided data includes at least one of fingerprint data, a palm print data, signature data and vein pattern data.

16. The method according to claim 14, wherein the providing comprises one or more of capturing an image of the subject using the image capture device and providing data input via a keyboard.

17. The method according to claim 14, further comprising performing a search of data that has been previously inputted to the main unit.

18. The method according to claim 14, further comprising printing a report containing at least a portion of data stored in the main unit.

19. The apparatus according to claim 1, wherein image capture device comprises a digital camera and at least one of an iris capture device or an iris scanner.

* * * * *